Aug. 3, 1948.   C. F. YOUNG   2,446,318
AIRCRAFT, CABLE GUIDE PULLEY
Filed April 23, 1945

INVENTOR.
Charles F. Young
BY
Herbert S. Fairbanks
ATTORNEY.

Patented Aug. 3, 1948

2,446,318

UNITED STATES PATENT OFFICE 2,446,318

AIRCRAFT CABLE GUIDE PULLEY

Charles F. Young, Philadelphia, Pa.

Application April 23, 1945, Serial No. 589,814

1 Claim. (Cl. 254—195)

The object of this invention is to devise a novel guide pulley wherein the frame or mounting is universally adjustable to give perfect alignment to pulley sheaves.

It has heretofore been found difficult to mount the pulley frame so that it is in perfect alignment with a predetermined direction of the cable which it was designed to accurately guide. Slight misalignment produced undesired stresses on both the frame and the cable, resulting in chafing of the cable and a consequent shortening of the cable life. The correction of such misalignment necessitated the remounting of the pulley frame, and such operation caused delay and additional labor and expense.

A primary object of this invention, therefore, is to devise an adjustable frame that can be readily adjusted to a selected position and securely locked in such position. The design permits instant realignment at any subsequent time without removing the pulley from its basic support or detachment of cables; and this can be accomplished without the use of special tools and equipment.

A further object of the invention is to devise a novel pulley frame requiring a minimum of labor for its installation, since only one hole is bored in the structure to which it is attached for the reception of a single mounting bolt.

A further object is to devise a novel pulley bracket that can be mounted on any straight, angular or slanting surface, and still provide sufficient adjustability to permit accurate alignment.

A further object is to devise a simple and compact construction having maximum strength and minimum weight which are very essential in aircraft applications.

With the foregoing and other objects in view as will hereinafter clearly appear, my invention comprehends a novel aircraft, cable guide pulley having a single mounting stud permitting three hundred and sixty degrees rotation of the assembly and preferably also one hundred and eighty degrees of lateral adjustment.

For the purpose of illustrating the invention, I have shown in the accompanying drawings a preferred embodiment of it which I have found in practice to give satisfactory and reliable results. It is, however, to be understood that this embodiment is typical only and that the various instrumentalities of which the invention consists can be variously arranged and organized and the invention is not limited to the exact arrangement and organization of these instrumentalities as herein set forth.

Similar numerals of reference indicate corresponding parts.

Figure 1:
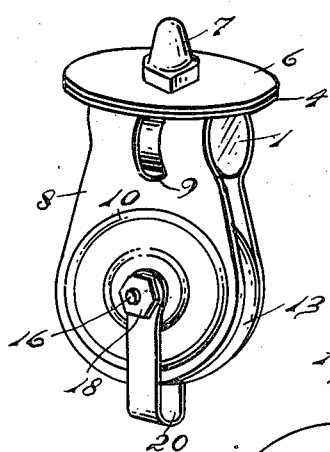
Figure 1 is a perspective view of an aircraft, cable guide pulley, embodying the invention.
Figure 2:
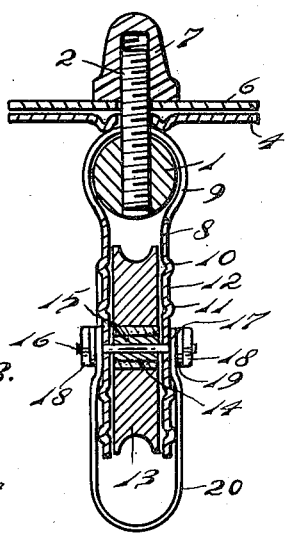
Figure 2 is a sectional elevation.
Figure 3:
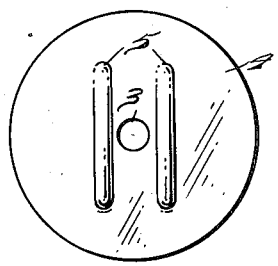
Figure 3 is a plan view of a saddle washer, in detached position.

Referring to the drawings:

The part 1 designates a cylindrical nut or bearing to which a threaded stud 2 is fixed in any desired manner, and as shown the stud is threaded in the nut. The stud 2 is adapted to pass through a central opening 3 in a saddle washer 4 having at opposite sides of its opening spaced ribs 5. The part 6 is a reinforcing washer against which a cap nut 7 bears, said cap nut being in threaded engagement with the stud 2.

The part 8 designates a frame in the form of a metal strip deflected to bear against the nut 1 and provided with a slot 9 through which the stud extends to provide one hundred and eighty degrees lateral adjustment relatively to the stud. The sides of the frame have concentric rings 10 and 11 pressed into them to strengthen the frame and to provide an annular depression 12 to receive lubrication for side wall lubrication.

The part 13 designates a wheel having a steel bushing 14 pressed in it and riding on an oil impregnated, porous bushing 15 to assure lifetime lubrication, the bushing being longer than the distance between the sides of the wheel to provide the necessary clearance for the wheel 13. The wheel is mounted on a threaded axle 16 which passes through axle openings 17 in the frame, and the parts are secured in assembled position by nuts 18 and lock washers 19.

The part 20 is a conventional guard strip carried by the axle.

The part 21 designates a portion of the aircraft or other support to which the pulley is to be attached.

It will now be apparent that in mounting the pulley only a single hole is necessary to receive the mounting stud 2. The pressed edges 5 in the saddle washer 4 act as additional supports for the frame and provide friction to prevent any rotation of the frame when the nut 7 is locked. When the nut 7 is loosened, the frame can be tilted or rotated to a desired position and upon tightening the nut 7 the frame and its adjuncts are securely locked in such position.

Figure 4:
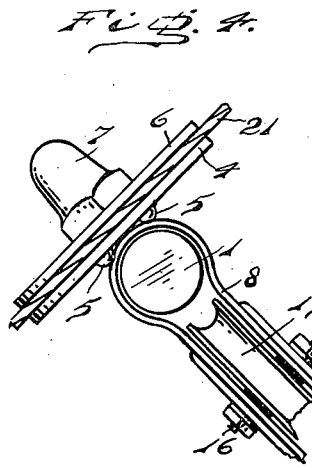
Figure 4 is a top plan view of the pulley assembly attached to an inclined surface of a supporting structure.

In Figure 4, the pulley is mounted in an inclined position.

Figure 5:
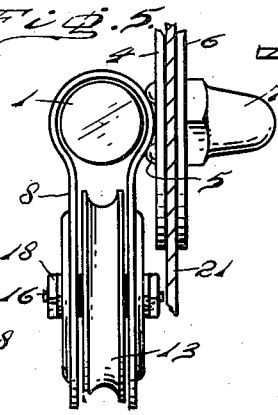
Figures 5 and 6 are top plan views of the assembly, showing different adjusted positions for identical cable directions.
Figure 6:
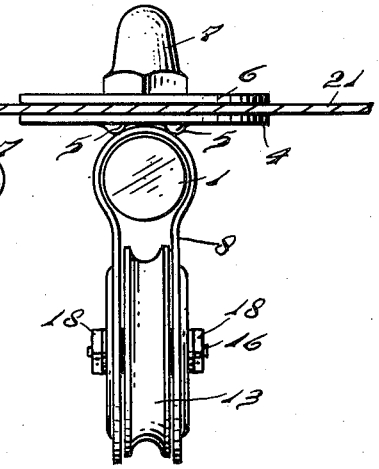

In Figures 5 and 6, the cable directions are identical but the surfaces to which the pulley frame is mounted are ninety degrees apart, showing the maximum adjustability accomplished by a single mounting hole, a single mounting bolt, and a slot in the frame.

The parts of the assembly except for the axle, bushings, stud, and securing nuts and washers are made of hard aluminum.

While I have described the cable guide pulley as primarily designed for aircraft applications, it is not limited to such use but may be employed with any desired structure where cables are used.

Having thus described my invention, what I claim as new and desire to secure by Letters Patent is:

In a cable guide pulley, a saddle washer in the form of a flat plate having spaced, raised ribs extending transversely across its outer face and having a central aperture between said ribs, a frame deflected to form an inner cylindrical seat with the outer face of the seat portion riding on said ribs, a cylindrical bearing extending laterally through said seat, said seat having a slot extending around it with the ends of the slot terminating outwardly of said bearing, a threaded stud fixed to said bearing and extending through said slot and aperture, a nut for said stud, and a wheel mounted in said frame.

CHARLES F. YOUNG.

REFERENCES CITED

The following references are of record in the file of this patent:

UNITED STATES PATENTS

| Number | Name | Date |
|---|---|---|
| 199,400 | Beach | Jan. 22, 1878 |
| 837,703 | Miller et al. | Dec. 4, 1906 |
| 1,480,948 | Olinger | Jan. 15, 1924 |
| 2,291,894 | Gwinn | Aug. 4, 1942 |
| 2,343,054 | Gwinn et al. | Feb. 29, 1944 |

FOREIGN PATENTS

| Number | Country | Date |
|---|---|---|
| 195,019 | Great Britain | Mar. 22, 1923 |